United States Patent Office 3,135,667
Patented June 2, 1964

3,135,667
PROCESS FOR SEPARATING AND PURIFYING RIBONUCLEASE
Kazuo Nakanishi, Tadashi Tagawa, and Sadamasa Minato, all of Tokyo, Japan, assignors to Sankyo Company, Limited, Tokyo, Japan
No Drawing. Filed Jan. 3, 1963, Ser. No. 249,133
Claims priority, application Japan Jan. 19, 1962
2 Claims. (Cl. 195—66)

This invention relates to a process for separating and purifying ribonuclease produced by fungi. More particularly, it relates to a process for separating and purifying ribonuclease from the solution containing ribonuclease produced by cultivation of fungi, such as the filtrate obtained by filtration of the liquor medium on which a fungus has been cultivated or the aqueous extract obtained by extraction with water of the solid medium on which a fungus has been cultivated.

As the process for separating and purifying ribonuclease from the solution containing ribonuclease produced by fungi has been hithertofore known a method in which a ribonuclease-containing solution is heat-treated under hydrochloric acid-acidic condition, the resulting solution is filtered, the filtrate is subjected to salting-out with ammonium sulfate, the resulting precipitate is subjected to dialysis and then the dialyzate is chromatographed on DEAE cellulose (diethylaminoethyl cellulose). According to said method, however, useful enzymes other than ribonuclease such as amylase, 5'-AMP deaminase and protease are inactivated owing to the heat-treatment of the ribonuclease-containing solution under hydrochloric acid-acidic condition. It is therefore disadvantageous in the hitherto-known method that these useful enzymes can not be isolated. Moreover, the yield of ribonuclease in said method is lower because of a portion of the ribonuclease inactivated as are other enzymes. Furthermore, the aforementioned known method has disadvantage from the industrial point of view that diethylaminoethyl cellulose, which is expensive and regenerated with difficulty is needed to use.

It is an object of this invention to provide a process for separating and purifying ribonuclease easily from a solution containing the same produced by fungi without the aforementioned disadvantages which accompanied the known method. Other objects will be apparent from the descriptions given herein below.

According to the present invention, these and other objects may be achieved by subjecting to dialysis a solution containing ribonuclease produced by fungi such as a filtrate obtained by filtration of the liquor medium on which a fungus has been cultivated or an aqueous extract obtained by extraction with water of the solid medium on which a fungus has been cultivated, buffering the dialyzate with a salt buffer solution prepared from an acid selected from the group consisting of lactic, acetic, propionic, nitric and sulfuric acids to form finally an about 1/20–4/10 M solution of the above-described acid having a pH of about 3.0–5.5, treating the buffered dialyzate with a high-porous weakly basic anion exchange resin in a salt form selected from the group consisting of lactate, acetate, propionate, nitrate and sulfate to adsorb the ribonuclease on said resin, eluting the ribonuclease adsorbed on said resin with an about 1/20–4/10 M salt buffer solution having a pH of about 3.0–5.5 prepared from an acid selected from the group consisting of succinic, citric and oxalic acids and thereafter repeating at least twice the dialysis, dialyzate buffering and ion exchange resin adsorption and elution procedures in the same way as above. From the solution containing ribonuclease thus obtained may be produced powders containing ribonuclease of excellent quality by subjecting the former to the conventional treatment such as freeze-drying or precipitation with an organic solvent such as ethanol and acetone.

The microorganism producing ribonuclease as mentioned above may be any of fungi. For example, *Aspergillus oryzae* and *Penicillium notatum* are the typical ones. In carrying out the process of the invention described above, the dialysis may be preferably effected by means of collodion or cellophane membrane as the membrane for dialysis. The buffering of the dialyzate may be carried out by adding to the dialyzate a salt buffer solution prepared from an acid selected from the group consisting of lactic, acetic, propionic, nitric and sulfuric acids containing said acid in a concentration higher than the acid concentration contained in final buffered dialyzate, preferably at least twice greater than the latter and having pH of about 3.0–5.5 in such a way that the acid concentration in the resulting dialyzate is about $1/20$–$4/10$ M, followed by adjustment of the pH to about 3.0–5.5 with an alkali such as sodium or potassium hydroxide. The high-porous weakly basic anion exchange resin in a salt form selected from the group consisting of lactate, acetate, propionate, nitrate and sulfate may be obtained by treating a high-porous weakly basic anion exchange resin in OH form with an about $1/20$–$4/10$ M salt buffer solution having pH of about 3.0–5.5 prepared from the acid as mentioned above in the same way as described above for the buffering of the dialyzate. For example, Duolite A–2 is treated with an alkali such as sodium hydroxide to convert the former to the OH form, followed by treatment of the resulting resin with a $1/10$ M lactate buffer solution having PH of about 5.0 adjusted with sodium hydroxide. The salt buffer solution prepared from an acid selected from the group consisting of succinic, citric and oxalic acids used as the eluting agent may be obtained by treating an about $1/20$–$4/10$ M solution of the aforementioned acid with an alkali such as sodium hydroxide to adjust the pH to about 3.0–5.5.

According to the process of this invention described above, in which there is no need to apply heating under hydrochloric acid-acidic condition, such enzymes as amylase, 5'-AMP deaminase and protease may be isolated in addition to ribonuclease without being accompanied by inactivation of the former. These enzymes may be isolated from the effluent in the ion exchange procedure in the process of this invention. Moreover, the desired product, ribonuclease, may be obtained in higher yield due to nonactivation of the enzyme because of no application of heating under hydrochloric acid-acidic condition. It is further of commercial advantage that the process of this invention may be carried out by the use of inexpensive ion exchange resin without the use of diethyl aminoethyl cellulose which is expensive and difficult to regenerate.

In order to facilitate further understanding of this invention, the following examples are given.

*Example 1*

As the starting solution is used a 500-ml. aqueous extract of 100 g. of a ribonuclease-containing powders obtained from solid cultivation of *Aspergillus oryzae*. The starting solution, which has a total activity of $261.8 \times 10^3$ units and a specific activity of 1.32, is dialyzed by means of a collodion membrane and to the dialyzate are added 50 ml. of a 1 M acetate solution having a pH of 4.5 adjusted with sodium hydroxide. The mixture is treated with sodium hydroxide to form a final $1/10$ M acetate solution having a pH of 5.0, which is used as the starting enzyme solution. Duolite A–2 is treated with 2 N sodium hydroxide, washed with water, treated with $1/10$ M acetate solution having a pH of 5.0 adjusted with sodium hydroxide and filled in a glass column. Duolite A–2 is a weakly basic, phenolic-type, porous anion exchange resin. The manufacture of Duolite A–2 is covered under U.S.

Patent 2,389,865. This patent contains a description of the base polymer used in making the final aminated product. Methods of converting a base polymer to a weakly basic anion exchanger are well known. In general, this is achieved by amination with a polyethylene amine. Duolite A–2 is a commercial item produced by Diamond Alkali Company, Western Division (formerly Chemical Process Company) since 1943 and is well known among those who use ion exchange resins. The above-described anzyme solution is flowed down in from the top of the resin column 3.5 x 40 cm. in size to adsorb the ribonuclease. After completion of the adsorption is flowed down a 1/10 M citrate solution having a pH of 5.0 adjusted with sodium hydroxide to elute the enzyme. The eluate has a total activity of $145.5 \times 10^3$ units and a specific activity of 83. The eluate is dialyzed using a collodion membrane, followed by twice-repeated adsorption and elution treatments in the same way as above by means of a Duolite A–2 column 2.2 x 30 cm. in size to give a ribonuclease solution having a total activity of $99.1 \times 10^3$ units and a specific activity of 530.

Example 2

A 500-ml. aqueous extract of 100 g. of a ribonuclease-containing powder obtained from solid cultivation of *Aspergillus oryzae* is used as the starting solution. The solution has a total activity of $156 \times 10^3$ units and a specific activity of 1.24. The solution is dialyzed by means of a cellophane membrane and to the dialyzate are added 60 ml. of a 1 M lactate solution having a pH of 4.5 adjusted with sodium hydroxide. The mixture is treated with sodium hydroxide to form a final 1/10 M lactate solution having a pH of 5.0, which is used as the starting enzyme solution. Duolite A–2 is treated with 2 N sodium hydroxide, washed with water, treated with a 1/10 M lactate solution having a pH of 5.0 adjusted with sodium hydroxide and filled in a column 3.0 x 30 cm. in size. The aforementioned enzyme solution is flowed down from the top of the resin column to adsorb the ribonuclease, followed by flow-down of a 1/10 M succinate solution having a pH of 5.0 adjusted with sodium hydroxide to collect eluted enzyme. The procedures are repeated three times to give a ribonuclease solution having a total activity of $31.5 \times 10^3$ units and a specific activity of 515.

Example 3

The same procedures as in Example 1 are repeated using a 500-ml. starting solution having a total activity of $140.0 \times 10^3$ units and a specific activity of 1.20 prepared in a similar way as in Example 1 except that propionic acid is used for adsorption and oxalic acid is used for elution. The procedures are repeated four times to give a ribonuclease solution having a total activity of $30.1 \times 10^3$ units and a specific activity of 450.

Example 4

The same procedures as in Example 1 are repeated using a 500-ml. starting solution having a total activity of $130.4 \times 10^3$ units and a specific activity of 1.81 prepared in a similar way as in Example 1 except that sulfuric acid is used for adsorption, ammonia being used for adjustment of pH and citric acid is used for elution, sodium hydroxide being used for adjustment of pH. The procedures are repeated four times to give a ribonuclease solution having a total activity of $28.6 \times 10^3$ units and a specific activity of 440.

Example 5

A 500-ml. starting solution having a total activity of $153.2 \times 10^3$ units and a specific activity of 1.70 prepared in a similar way as in Example 1 is treated in the same way as in Example 1 except that acetic acid is used for adsorption and oxalic acid is used for elution. The procedures are repeated four times to give a ribonuclease solution having a total activity of $39.8 \times 10^3$ units and a specific activity of 475.

Example 6

A 500-ml. starting solution having a total activity of $181.4 \times 10^3$ units and a specific activity of 1.51 prepared in a similar way as in Example 1 is treated in the same way as in Example 1 except that lactic acid is used for adsorption and succinic acid is used for elution. The procedures are repeated four times to give a ribonuclease solution having a total activity of $61.7 \times 10^3$ units and a specific activity of 571.

Example 7

A 500-ml. aqueous extract of 100 g. of a ribonuclease-containing powder obtained from solid cultivation of *Aspergillus oryzae* is used as the starting solution, to which calcium acetate is added to form precipitate. The precipitate is removed and the resulting solution is dialyzed, followed by preparation of a final 1/10 M lactate solution having a pH of 5.0, which is used as the starting enzyme solution. Duolite A–2 on the market in OH form is buffered with a 1/10 M lactate solution having a pH of 5.0 adjusted with sodium hydroxide and then filled in a glass column. The aforementioned enzyme solution having a total activity of $153.1 \times 10^3$ units and a specific activity of 1.80 is flowed down from the top of the column 2.2 x 40 cm. in size to adsorb a total activity of $143.6 \times 10^3$ units of ribonuclease. The effluent has a total activity of $9.5 \times 10^3$ units. From the effluent may be recovered amylase. A 1/10 M lactate solution having a pH of 5.0 is then flowed down from the top of the column for washing, followed by flow-down of a 1/10 M citrate solution having a pH of 5.0 adjusted with sodium hydroxide to collect the eluted enzyme in a fraction collector. The enzyme solution collected has a total activity of $143.2 \times 10^3$ and a specific activity of 83.0. The enzyme solution is fractionally precipitated with ammonium sulfate, followed by collection of precipitate from a fraction of 0.5–1.0 saturation at pH 4.0 to obtain an enzyme solution having a total activity of $139.0 \times 10^3$ and a specific activity of 109.5. The enzyme solution is repeatedly twice subjected to column-chromatographic procedures on Duolite A–2 to give a highly purified ribonuclease solution, which has a total activity of $117.9 \times 10^3$ and a specific activity of 620.

Example 8

As the starting solution is used a 820-ml. aqueous extract of the solid medium on which *Penicillium notatum* has been cultivated. The starting solution, which has a total activity of 508.4 units and a specific activity of 0.022, is dialyzed by means of a cellophan membrane and dialyzate are added 100 ml. of a 1 M lactate solution having a pH of 4.5 adjusted with sodium hydroxide. The mixture is treated with sodium hydroxide to form a final 1/10 M lactate solution having a pH of 5.0, which is used as the starting enzyme solution. Duolite A–2 is treated with 2 N sodium hydroxide, washed with water, treated with a 1/10 M lactate solution having a pH of 5.0 adjusted with sodium hydroxide and filled in a coluumn 2.2 x 30 cm. in size. The aforementioned enzyme solution is flowed down from the top of the resin column to adsorb the ribonuclease, followed by flow-down of a 1/10 M citrate solution having a pH of 5.0 adjusted with sodium hydroxide to collect eluted enzyme. The procedures are repeated four times to give a ribonuclease solution having a total activity of 98.0 units and a specific activity of 51.2.

We claim:
1. A process for separating and purifying ribonuclease from a solution containing the same produced by fungi which comprises the step of subjecting said solution to dialysis, buffering the dialyzate with a sodium or potassium salt buffer solution prepared from an acid selected from the group consisting of lactic, acetic, propionic, nitric and sulfuric acids to form finally an about 1/20–1/10 M solution of the above-described acid having a pH of about 3.0–3.5, treating the buffered dialyzate with a highly-porous weakly basic anion exchange resin in a salt form selected from the group consisting of lactate, acetate, propionate, nitrate and sulfate to adsorb ribonuclease on said resin, eluting the ribonuclease adsorbed on said resin with an about $\frac{1}{20}$–$\frac{4}{10}$ M sodium or potassium salt buffer solution having a pH of about 3.0–5.5 prepared from an acid selected from the group consisting of succinic, citric and oxalic acids.

2. The process for separating and purifying as set forth in claim 1, including the further step of repeating the dialysis, the dialyzate buffering and ion exchange resin adsorption and elution steps as recited in said claim.

References Cited in the file of this patent

Scheraga et al.: Advances in Enzymology 24, 161–261 (pages 167–172 relied on). 1962. QP601A1A3–161–261.